T. E. BROWN.
ART OF CENTRIFUGAL SEPARATION.
APPLICATION FILED JAN. 28, 1915.

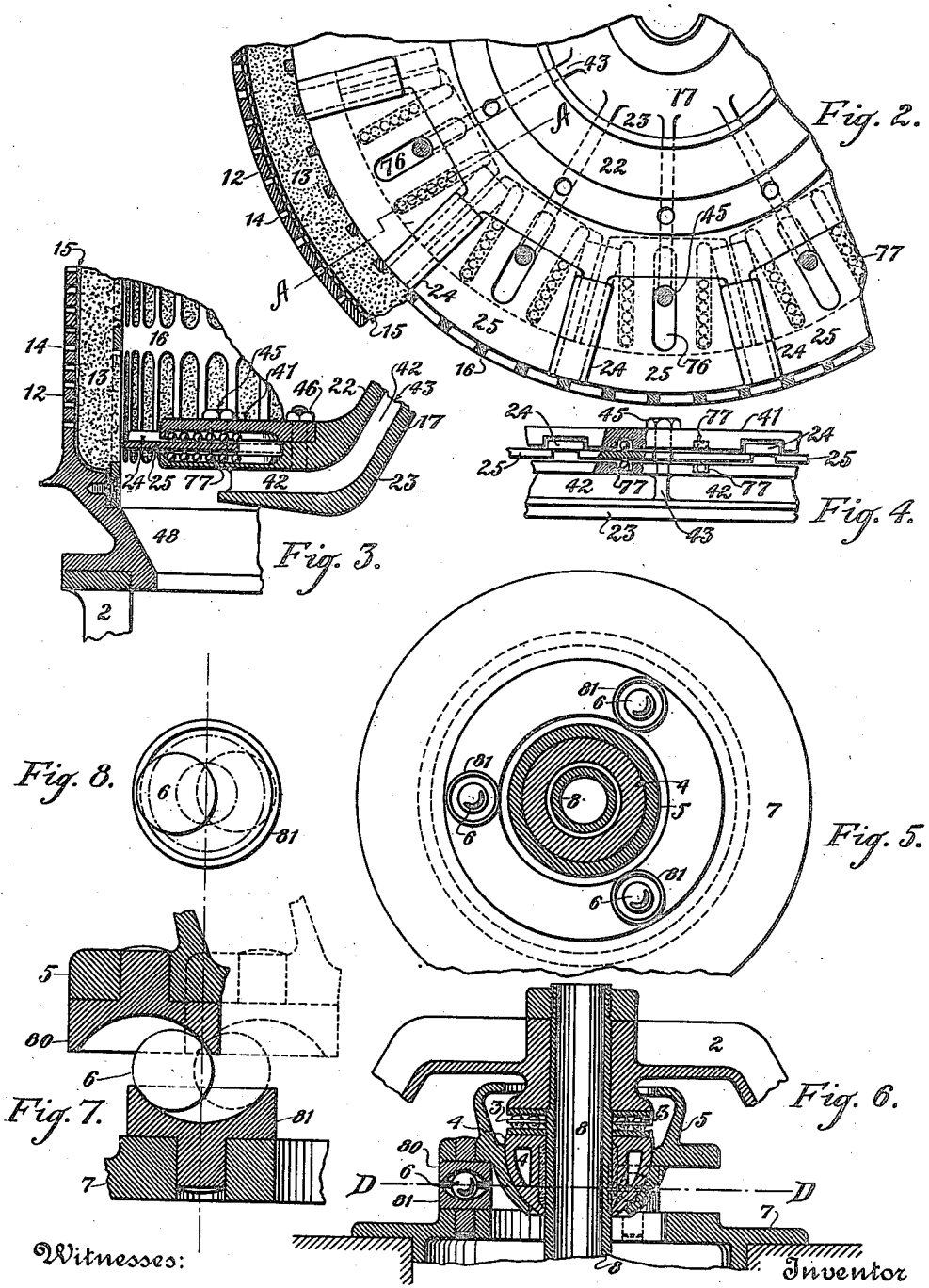

1,165,567.

Patented Dec. 28, 1915.
3 SHEETS—SHEET 3.

Witnesses:
Thos. E. Brown, Jr.
C. J. Westlin

Inventor
Thomas E. Brown

UNITED STATES PATENT OFFICE.

THOMAS E. BROWN, OF NEW YORK, N. Y.

ART OF CENTRIFUGAL SEPARATION.

1,165,567.   Specification of Letters Patent.   Patented Dec. 28, 1915.

Application filed January 28, 1915. Serial No. 4,813.

*To all whom it may concern:*

Be it known that I, THOMAS E. BROWN, a citizen of the United States, and a resident of the borough of Manhattan, in the county of New York and State of New York, have invented certain new and useful Improvements in the Art of Centrifugal Separation, of which the following is a specification.

This invention relates to improvements in the art of centrifugal separation, and as well to the process or method as to the apparatus.

The invention applies particularly to the continuous centrifugal separation of solids and liquids and to the apparatus used for the said separation of solids from liquids, as in the filtration of precipitates in chemical processes, the separation of valuable liquids from the pulp in metallurgical processes, the clarification of sewage and of liquids in general; and an object of my invention is to enable various steps in such processes, such as the placing of the filtering material and of the mixture, the filtration and the final discharge of the concentrates, to be performed while the machine remains in continuous revolution, thereby avoiding the wear and tear, loss of power and waste of time incident to the continual starting and stopping of the machine, usual in ordinary practice.

Another object of my invention is to provide a granular filtering medium such as sand or charcoal, and to supply such granular medium to the machine during the revolution of the machine, and thereby obtain a uniform and compact filtering body.

Another object of my invention is to enable the machine to revolve smoothly about its center of gravity and render it "self-balancing", notwithstanding changes in said center due to variations of position of its parts or contents. And still another object of my invention is to perform the various steps automatically in proper succession and at suitable intervals of time, and the means I employ to effect this is a fluid under pressure, preferably compressed air.

Various forms of apparatus may be constructed embodying my invention and suited to various kinds of materials, and while I show the preferred form in the accompanying drawings, I do not confine myself to the specific form shown and described.

Figure 1:
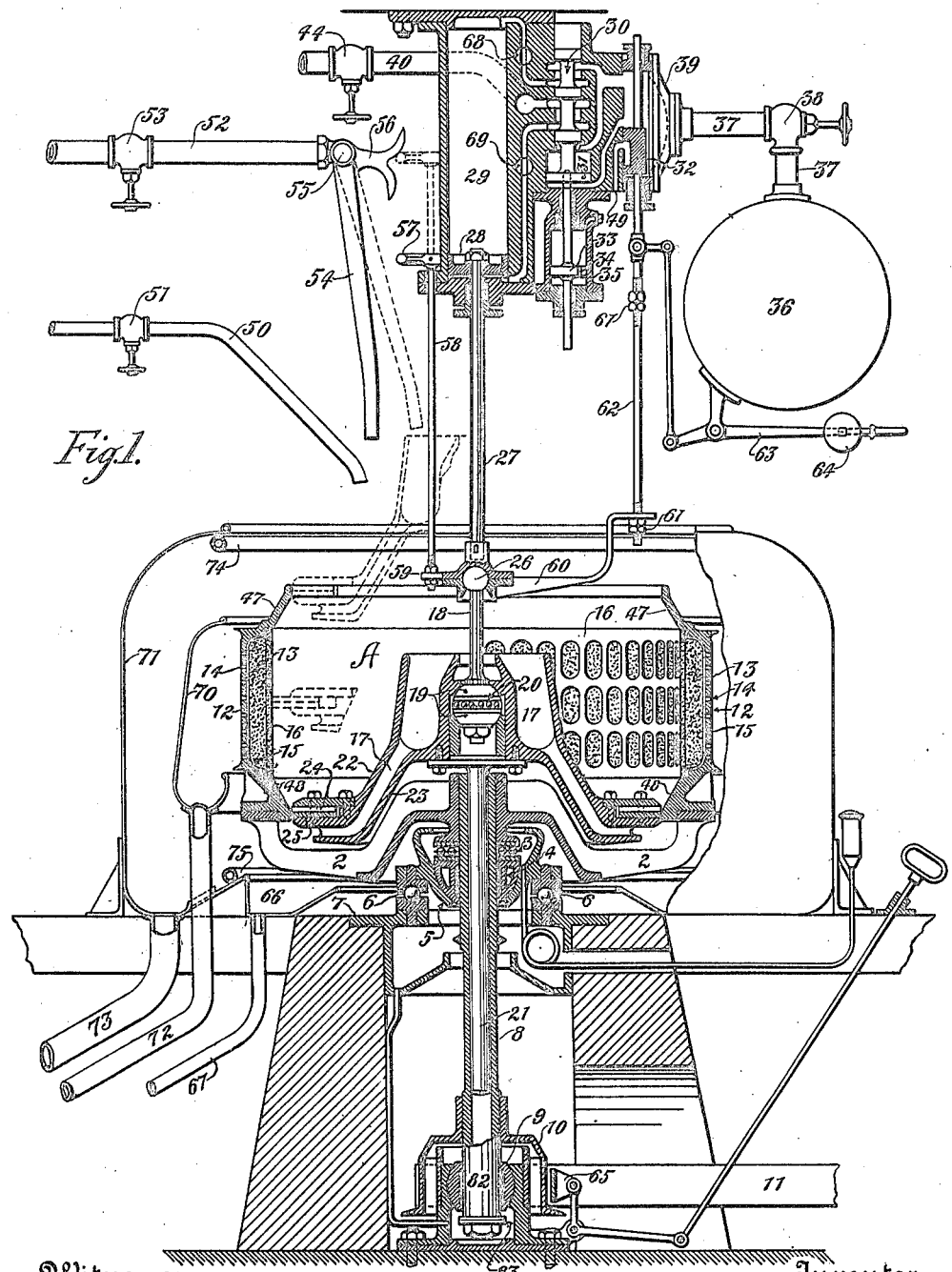

Figure 1 shows the apparatus in axial section; Fig. 2 is a broken horizontal section; Fig. 3 is a broken vertical section on line A—A of Fig. 2, and Fig. 4 a broken end view, on enlarged scale showing the preferred arrangement of the filtering body and expansible partition or piston. Figs. 5, 6, 7 and 8 show the details of the "self-balancing" device, and Figs. 9, 10, 11, 12, 13 and 14 show various constructions of expansible partitions or pistons.

Referring to Fig. 1, A is a centrifugal rotary vessel mounted on frame 2 resting on thrust bearing 3 which is carried by spherical bearing 4 in the casting 5 which is in turn supported by the oscillating balls 6 on the base plate 7.

8 is the axle of the machine within which is a guide spindle 21, said axle 8 being attached to frame 2 and carried in the bearings 4 and 9, and which may be revolved in any suitable manner, as by pulley 10 and belt 11. The shell 12 of vessel A is preferably coarsely perforated, and is so shaped as to form a space for the granular filtering material 13 which is prevented from passing out through the coarse perforations 14 in said shell by the screen 15. On the inside of said granular material 13 is preferably placed a grating 16, which serves as a guide for an expansible partition or piston 17, and also to protect the filtering material from the action of said expansible partition or piston 17. The upper and lower portions of the shell 12 are extended inwardly to form containers 47 and 48 for the separating mixture, and prevent said mixture from flowing out at the ends of the vessel during separation.

It will be understood that in general, as Fig. 1 is a vertical axial section, the members described are circular in form and symmetrical with relation to the axis of rotation of the apparatus.

The expansible partition or piston 17, (Figs. 1, 2, 3 and 4) which is so constructed as to expand and contract to fit the varying diameters of the parts over which it passes, is carried on a connecting rod 18, by means of a ball joint 19, with thrust bearing 20 such that the expansible partition or piston 17 may rotate with the vessel A without rotating the connecting rod 18. Said guide spindle 21 prevents the said expansible partition or piston 17 from tilting with relation to the vessel A, and said guide spindle 21 moves up and down in axle 8 which is made hollow to receive it. Said expansible partition 17 is provided with upper and lower deflecting plates respectively 22 and 23, (Figs. 1, 2 and 3) and on its periphery is preferably provided with sliding plates 24 and 25 respectively, as shown in enlarged detail in Figs. 2, 3 and 4 and hereinafter described more fully in connection with those figures. The arrangement of said plates 24 and 25 is such that they may slide radially inwardly and outwardly, to enable the diameter of the partition or piston to conform to the varying diameters of the said containers 47 and 48 and the grating 16, during its reciprocating motion from the bottom to the top of the vessel, and vice versa. Said deflecting plates 22 and 23 form between them an annular passage for the materials to be separated to flow to the under side of said partition or piston 17. Said connecting rod 18 is connected by means of the ball joint 26 to the piston rod 27 and the piston 28 working in the cylinder 29. Piston 28 is operated by means of the valve 30 and differential piston 31, said differential piston 31 being operated in turn by auxiliary valve 32. The time of the movement of said valve 30 by the differential piston 31 is controlled by dash pot piston 33 and regulated by means of a leakage hole 34 in said dash pot piston, the dash pot cylinder 35 being filled with oil or other suitable liquid.

36 is a reservoir for compressed air, which may be supplied in any suitable manner, as by an air pump. The compressed air is carried by pipe 37 to the auxiliary valve chest 39, the valve 38 being used to admit and control the flow of the compressed air through pipe 37. Pipe 50 and valve 51 are for the admission of the granular filtering material to the separating vessel, and pipe 52 and valve 53 are for the admission of the materials to be separated. Pipe 52 terminates in the movable nozzle 54 carried on the flexible joint 55; said nozzle 54 being movable by means of the cam-shaped member 56 operated by the tappet 57 on the rod 58 attached to the end of the piston rod 27 by means of the arm 59. Said tappet 57 therefore reciprocates with piston 28 and the expansible partition or piston 17. Said auxiliary valve 32 is operated normally by the arm 60 carried on piston rod 27, which arm, at each end of the stroke, comes in contact with the stops 61 on the valve rod 62. Said valve rod 62 may also be operated when desired by means of hand lever 63, which serves also to carry the balance weight 64, which weight balances the weight of said valve and rods.

65 is a brake acting on pulley 10 to stop the rotation of the machine when occasion requires, and operated by any suitable device.

70 is a stationary casing or trough to receive the separated liquid ejected from the vessel A. Said liquid is carried from said casing 70 by the pipe 72 to any desired place.

71 is an outside stationary casing or trough to receive the ejected separated solids. 74 and 75 are perforated pipes for the admission of water to wash the ejected solids from casing 71, from which they may be led away by the pipe 73.

The operation of the machine is as follows: The machine having been set in rotation by means of pulley 10 and belt 11 the valve 38 is opened admitting compressed air to the cylinder 29, the expansible partition or piston 17 and piston 28 being in the lower position as shown in Fig. 1. Auxiliary valve 32 being in the position shown in the drawing, the compressed air enters below differential piston 31, and, by reason of its excess of area over the area of the valve 30, said valve 30 is lifted, thus connecting the upper end of cylinder 29 with the exhaust pipe 40, and at the same time admitting compressed air to the under side of piston 28, which then ascends, carrying with it, by means of the piston rod 27 and connecting rod 18, the expansible partition or piston 17. As said expansible piston 17 rises the movable plates 24 and 25, by reason of their centrifugal force, move outward and keep in contact with the inside surface of the said containers 47 and 48 and the said grating 16. When said piston 28 reaches the upper end of the said cylinder 29 said arm 60 comes in contact with the upper stop 61 on the valve rod 62, and raises the auxiliary valve 32 to such position that the under side of differential piston 31 is connected with the special exhaust 49, when by reason of the excess pressure on the upper side of said piston 31, valve 30 slowly descends to the position shown in Fig. 1, and admits compressed air to the top of the said piston 28, connecting under side of piston 28 with the exhaust pipe 40, and when this is effected, piston 28 descends. The said expansible partition or piston 17 remains in its upper position as shown by the dotted lines, during the change of position of the valve 30, which change takes place slowly by reason of the resistance to motion of the dash pot piston 33, which is moving in a body of liquid, preferably oil; and therefore said dash pot can only move at the rate at which the liquid will flow through the small leakage hole 34 in the dash pot piston, and therefore the time during which the expansible piston 17 remains at the top of the vessel is determined by the size of the leakage hole 34 in the dash pot piston 33. Similarly, when the expansible piston 17 is at the bottom of the vessel, it remains there an equivalent length of time during the change of position of valve 30 in the reverse direction. The expansible partition or piston 17 having been caused to make a few strokes to show that all is in working condition, said valve 51 on supply pipe 50 for supplying the granular filtering material (preferably sand or charcoal) is opened, admitting a stream of water carrying said filtering material. Said material falls on the upper deflecting plate 22 of the expansible piston 17 (see Fig. 1) and is thrown by centrifugal force onto and through the grating 16, gradually filling the space between said shell 12 and said grating 16, thus forming the filtering body 13, the carrying fluid escaping through the screen 15 and through the perforations in shell 12, and being caught by the trough 70 is carried off by the pipe 72. During this process the expansible piston 17 is allowed to reciprocate, so as to properly distribute the filtering material. When the body of filtering material 13 thus formed is completed, and an amount slightly in excess of that required has been admitted, the valve 51 is shut off, and the continued reciprocation of the expansible piston 17 scrapes off any excess from the grating 16, and ejects it over the top and bottom edges of the containers 47 and 48, whence it is caught in the outer trough 71 and washed away by streams of water from the perforated pipes 74 and is carried away by the pipe 73.

The apparatus is now ready for separation, which is effected in the following manner: The valve 53 is opened and the mixture to be separated admitted through the pipe 52 and the movable nozzle 54 and, (assuming the partition 17 to be in its lower position as shown in Fig. 1) the mixture falls upon the upper deflecting plate 22, and is thrown by the centrifugal force upon the grating 16 and filtering body 13, the liquid escaping through the said filtering body as previously described for the liquid carrying the filtering material, and the solids accumulate on the surface of said material 13 and said grating 16. As the expansible partition or piston 17 rises it carries the separated solids along with it. When it reaches about the center of its stroke—as shown by the dotted lines in Fig. 1, the tappet 57 comes in contact with the cam shaped member 56 and throws the movable nozzle 54 inward so that the materials to be separated now fall inside of the upper deflecting plate 22 and on to the lower deflecting plate 23, and are carried by the centrifugal force to the under side of the expansible piston 17. Said expansible piston 17 continues to rise until it reaches the upper end of its stroke, and the solid materials accumulated above it are ejected over the top edge of the container 47 and are carried by centrifugal force into the trough 71, from whence they are carried by streams of water from the perforated pipes 74 out by the pipe 73. The expansible partition or piston 17 remains in its upper position during the movement of the valve 30 controlled by the dash pot piston 33 as before described, during which time and until it reverses its motion and again reaches the center of its stroke, the materials to be separated are falling on the lower deflecting plate 23, and are undergoing separation on the surface of the filtering body 13 below said expansible piston 17.

When the piston 17 on its downward stroke reaches about the middle of its stroke the tappet 57 again comes in contact with the cam shaped member 56 and throws the nozzle 54 outwardly, and the materials then fall again on the upper deflecting plate 22 and on the filtering body 13 and grating 16, above the expansible piston 17; the expansible piston 17 continues moving downward until it reaches the bottom of its stroke and ejects the solids which have accumulated below it from the container 48. The motion again reverses and the operation continues automatically, separation and discharge of solids taking place above and below expansible piston 17 alternately. The length of time the expansible partition 17 remains at rest at the ends of its stroke is governed primarily by the size of the leakage hole 34 in the dash pot piston 31, but is also a function of the length of stroke and lap of the valve 30, and the time required for the motion of piston 28 is regulated by the plug valves 68 and 69 in the ports of cylinder 29, and by the valves 38 and 44 on the compressed air and exhaust pipes respectively. It will be understood that said plug valves 68 and 69 and the said valves 38 and 44 are adjusted to the desired degree of opening by the attendant. I prefer to place the cylinder 29 directly over the center of the machine as shown, but obviously, where the head room may be insufficient, or for other reason this cannot be done, it may be placed in any other convenient position and connected to the expansible partition or piston 17 by means of levers, bell cranks or other suitable devices, and also, while I prefer in this type of apparatus to use compressed air for the operation of the piston 28, it is quite obvious that a liquid under pressure, such as water or oil, may be used if preferred. In case a liquid is used instead of compressed air the dash pot piston 33 may be dispensed with, and the rapidity of the movement of the piston 28 be governed entirely by throttling the inlet and exhaust ports of cylinder 29 and differential piston 31. It is also obvious that all of the operations may be performed by hand manipulation of the said lever 63, and if automatic operation is not required said lever 63 may be connected directly with valve 30, and the dash pot 33 and valve 32 be dispensed with.

The machine may be single acting only, if preferred, i. e., may always separate above piston 17 and discharge from the top of vessel A or separate always below piston 17 and discharge from the bottom of vessel A. In the latter case, if preferred, discharge may take place when the machine is not rotating at speed, by applying the brake 65, and when the rotation is by said brake made sufficiently slow, or has entirely ceased, the materials may be ejected into the trough 66, and may be carried away in any suitable manner.

When after a period of use the filtering material 13 becomes clogged or foul and requires renewal, the machine may be stopped by said brake 65 and the piston 28 be moved into its center position by means of the lever 63. The filtering material may then be washed out, preferably by a stream of water from a hose, into the trough 66, whence it is carried away by the pipe 67, and after suitable treatment used over again.

More particularly describing certain details of the construction of said expansible partition 17 and certain adjacent parts, said deflecting plates 22 and 23 are separated by ribs 43 sufficiently to form passages 42 for the materials to be separated to pass to the under side of 17. Said sliding plates 24 and 25 are held in place by the holding down plate 41 and bolts 45 and 46. (See Figs. 2, 3 and 4.) The lower sliding plates 25 are preferably comparatively wide and have slots 76 around bolts 45 to allow of radial motion. The upper sliding plates 24 are preferably only wide enough to cover the space between plates 25 when in outer position, and said plates 24 are preferably guided in recesses in the holding down plate 41. (See Fig. 4).

In order to reduce friction I prefer to support the plates 25 between balls 77 in grooves as shown, in the holding down plate 41 and the deflecting plate 22. The arrangement as clearly shown is such that the sliding plates 24 and 25 may readily move radially inwardy and outwardly, thus varying the diameter of the expansible partition or piston 17. When the machine is rotating the centrifugal force moves said plates 24 and 25 outwardly, and holds them firmly against the surfaces of the containers 47 and 48 and the grating 16, and, as said piston or partition 17 reciprocates plates 24 and 25 remain in contact with said surfaces, so that the said expansible partition or piston 17 varies in diameter to suit the varying diameters of the vessel A, and thus the plates 24 and 25 act as ejectors to scrape the separated solids from the surface of grating 16, filter body 13 and containers 47 and 48 and eject said separated solids from the ends of the vessel A. Obviously by making said slots 76 of proper lengths, and by applying suitable stops to plates 24 so as to limit the outward radial motion of plates 24 and 25, the grating 16 could be dispensed with; but I prefer to use said grating as tending to better protect the surface of the filtering body 13 and preserve it in good order. The grating 16 may be a wire screen or a plate perforated in any suitable manner, or even a strong textile fabric such as heavy canvas, but I prefer to make it of slotted metal as shown.

Obviously the machine as shown in Fig. 1, with its reciprocating expansible partition or piston 17, and with the operating mechanism shown, can be used without the granular filtering body 13 and with the perforated and imperforate separating vessels commonly used in the art.

Figure 9:
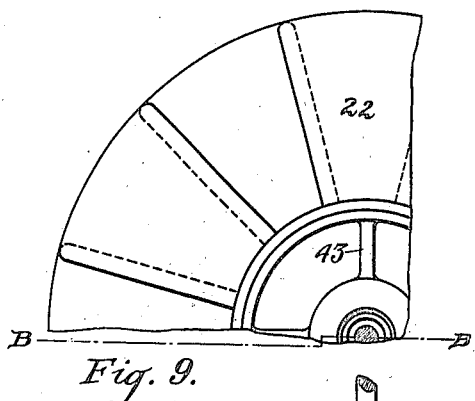
Figure 11:
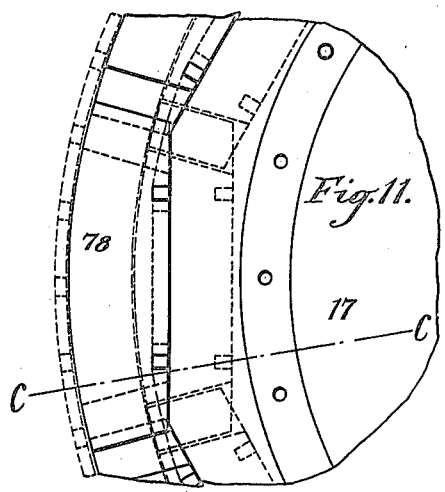
Figure 10:
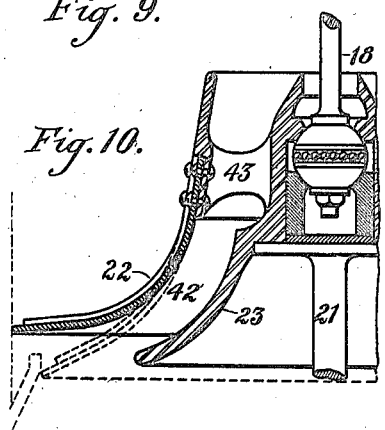
Figure 12:
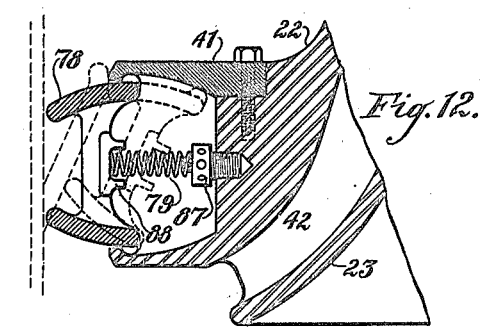
Figure 14:
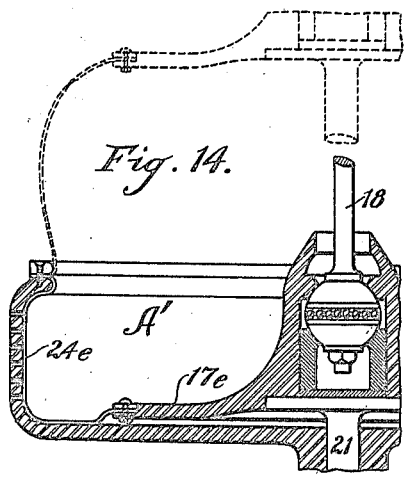
Figure 13:
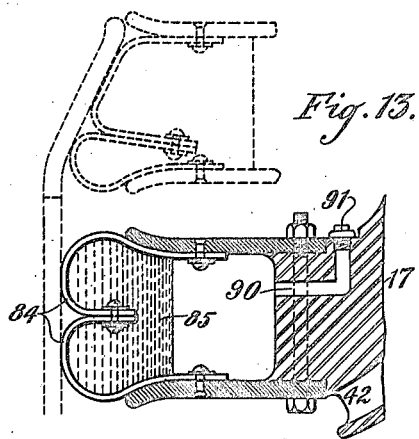

I do not confine myself to the precise form of expansible partition or piston hereinbefore described, as obviously such a partition or piston may be made in various forms, some of which I have shown in Figs 9 to 14. Fig. 9 is a partial plan view and Fig. 10 a partial section on line B B, of Fig. 9, of a form in which the expansibility of the partition 17 is obtained by forming the upper deflecting plate 22 of segmental overlapping elastic plates, which by their elasticity may take the position shown by the dotted lines to conform to the narrower portions 47 and 48 of the separating vessel. Fig. 11 is a broken plan view, and Fig. 12 is a broken section, on line C C, of a form of expansible partition or piston, in which, instead of the flat plates 24 or 25 (shown in Figs. 2, 3 and 4), I use curved rotatable segments 78 overlapping at their ends. With this form I prefer to use springs 79 to assist the centrifugal force in holding the rotatable segments against the surface of the separating vessel and filtering medium; said springs 79 being held between adjusting screws 87 and sockets 88, as shown in Fig. 12. Fig. 13 is a partial section of a form of expansible partition in which, instead of the sliding plates 24 and 25, as shown in Fig. 2, I make the expansible portion 84 of the partition or piston 17 of flexible material, such as rubber, or canvas and rubber, and press said flexible material against the filter surface or surface of the separating vessel by the pressure of a liquid 85, and preferably by the pressure in the said liquid 85 induced by the rotation of the machine. This form is particularly valuable for use with imperforate vessels. Said liquid 85 is introduced before starting the machine by a filling hole 90 and screw plug 91. Fig. 14 shows in broken vertical section a form of expansible partition or piston suitable for use with single acting machines, i. e. such as discharge at one end of the separating vessel only, though it may readily be adapted to double acting machines. In this form the expansible portion $24^e$ of the partition or piston $17^e$ is also the filtering medium, and consists of a flexible material suitable for use as a filter, such as heavy canvas. Separation takes place on the inner surface of said expansible portion 24ᵉ of partition or piston 17ᵉ, and after separation piston 17ᵉ rises to the position shown by the dotted lines, and the accumulated solids are lifted out of the vessel A', and are discharged by centrifugal force from what has now become the outer surface of 24ᵉ. (See Fig. 14). After discharge the piston 17ᵉ returns to its former position, dragging 24ᵉ down in vessel A', and the centrifugal force sets said flexible material 24ᵉ out and in position against the wall of vessel A', ready for another charge of material to be separated.

The rotating parts of the apparatus hereinbefore described may, due to the motion of the relatively movable parts or the shifting of the contents of the separating vessel, change the position of their center of gravity; therefore in order that the machine may be enabled to change its center of rotation so that it may always coincide or nearly coincide with the center of gravity, as said center of gravity changes, the upper bearing 4 should preferably be free to move or oscillate in a lateral direction in order to render the machine as commonly expressed, "self-balancing." I therefore support the rotating portions of the machine by means of thrust bearing 3, spherical bearing 4, casting 5 and balls 6, resting in turn on the base plate 7, all as described for Fig. 1.

Figs. 5, 6, 7 and 8 show the "self-balancing" feature on a larger scale. Referring to these figures, 2 is the supporting frame secured to the axle 8 and rotating with same; said frame 2 rests on ball bearing 3 and the axle 8 rotates in the spherical bearing 4. Said spherical bearing 4 does not rotate with the axle 8, but is free to move in the casting 5 which supports it. Casting 5 carries the cups 80 which rest upon the balls 6, said balls 6 resting in turn in similar reversed cups 81 supported by the base plate 7. Balls 6 may be of any desired size, each in its individual pair of cups, and of such number as may be necessary to properly support the weight of the centrifugal machine and its contents; but I prefer, whenever practicable, to use balls of such large diameter that but three are sufficient to carry said load, and thereby insure an equal distribution of weight on the balls.

When the machine is in rotation if the center of gravity lies in the geometrical axis, i. e., the center line of the axle 8, the balls 6 remain stationary in the center of their cups; but when the center of gravity does not lie in the center line of said axle 8, the machine then tends to revolve around an axis through its center of gravity, and said axle 8, together with the spherical bearing and casting, have an eccentric motion. Under this condition said balls 6 move in a circle in their cups of a radius approximately equal to the eccentricity, as shown in Fig. 8.

If the balls revolved between flat surfaces the conditions required for self-balancing would be attained, but there would be no tendency to bring the machine back to its mechanical center, and nothing to prevent a motion of translation, which would carry the machine beyond its proper limits. I therefore use the spherical cups described, with which, as will be evident from Fig. 7, when said balls 6 are in circular motion the rotating machine will be lifted by the rise of the balls on the surface of the lower cup and the rise of the upper cup on the balls, and thus there will be a centralizing force equal to the component of the total weight of the entire machine, tending to bring the machine back to the mechanical center. The radius of the cups can be determined by calculation, when the moment of inertia, mass and the maximum variation of the position of the center of gravity to be allowed for are known. In order to admit of the lifting of the machine described, the lower end of said axle 8 is made slightly longer than the bearing 9, (see Fig. 1), and washers 83 are placed on the end of journal 82 to admit of and limit the vertical motion and prevent the machine from rising far enough to allow the balls 6 to fly out of their cups. The washers 83 also serve to prevent the machine from being lifted out of its bearing by the action of said piston 28 should any obstruction be caught between said movable partition 17 and the grating 16.

Now having described my invention what I claim is:

1. In a centrifugal separator the combination of a rotary separating vessel, a filter of granular material other than the materials undergoing separation, and means adapted to supply said granular material to said vessel during the revolution of the machine.

2. In a centrifugal separator the combination of a separating vessel, a filter therein, an ejector, means to reciprocate said ejector, and a grating to protect the surface of said filter from the action of said ejector.

3. In a centrifugal machine the combination of a separating vessel, a filter composed of granular material other than the materials undergoing separation, means for placing said granular material in said vessel during the revolution of the machine, and an ejector adapted to remove the separated solids from said filter.

4. In a centrifugal machine the combination of a separating vessel, a filter of granular material other than the material undergoing separation, means for placing said granular material in said vessel during the revolution of the machine, an ejector to remove the separated solids from said filter, and means to reciprocate said ejector.

5. In a centrifugal separator the combination of a separating vessel, a filter of granular material in said vessel, an ejector adapted to remove the accumulated solids from said filter, means to reciprocate said ejector, and a grating to protect the surface of said filter from the action of said ejector.

6. The combination in a centrifugal separator of a separating vessel, a partition therein and means adapted to deliver the materials to be separated to one side and the other of said partition alternately.

7. The combination in a centrifugal separator of a separating vessel, a partition therein adapted to eject the separated solids and means to reciprocate said partition and eject the separated solids from both ends of said vessel.

8. The combination in a centrifugal separator of a separating vessel, a partition therein, means to reciprocate said partition, means to deliver the materials to be separated to each side of said partition and eject the separated solids from each end of said vessel alternately.

9. In a centrifugal separator, the combination of a separating vessel, a reciprocating partition therein, and means to guide the inflowing materials to each side of said partition alternately.

10. In a centrifugal separator, the combination of a separating vessel, a reciprocating piston therein adapted to vary its diameter, and means to vary the diameter of said piston to fit the varying diameters of said vessel.

11. In a centrifugal separator, the combination of a separating vessel, a reciprocating partition therein adapted to guide the inflowing mixture, and means to vary the diameter of said partition to fit the varying diameters of said vessel.

12. In a centrifugal separator the combination of a separating vessel, a reciprocating member therein adapted to eject the separated solids, and means to vary the diameter of said member to fit the varying diameters of said vessel.

13. In a centrifugal separator the combination of a separating vessel, a movable member therein, means to reciprocate said member, and means to vary the diameter of said member during its reciprocating motion.

14. In a centrifugal separator the combination of a separating vessel, a partition therein and automatic means adapted to supply the materials to be separated to one side and then to the other side of said partition alternately in accordance with the movements of said partition.

15. In a centrifugal separator the combination of a separating vessel, a movable partition therein, and means to reciprocate said partition and to supply the materials to be separated to one side and then to the other side of said partition alternately, in accordance with the movements of said partition.

16. In a centrifugal separator, a separating vessel, a partition therein adapted to eject the separated solids, and automatic means to reciprocate said partition and eject said separated solids from each end of said vessel alternately, in accordance with the movements of said partition.

17. The combination in a centrifugal separator of a separating vessel and a movable partition therein adapted to eject the separated solids from each end of said vessel alternately.

Signed at New York city in the county of New York, and State of New York this 27th day of January, A. D. 1915.

THOMAS E. BROWN.

Witnesses:
 CLINTON B. BROWN,
 C. T. WESTLIN.